April 24, 1928. 1,667,287
J. M. COBURN ET AL
SOUND PROJECTING HORN ON WING STRUCTURE OF AIRCRAFT
Filed June 2, 1926 2 Sheets-Sheet 1
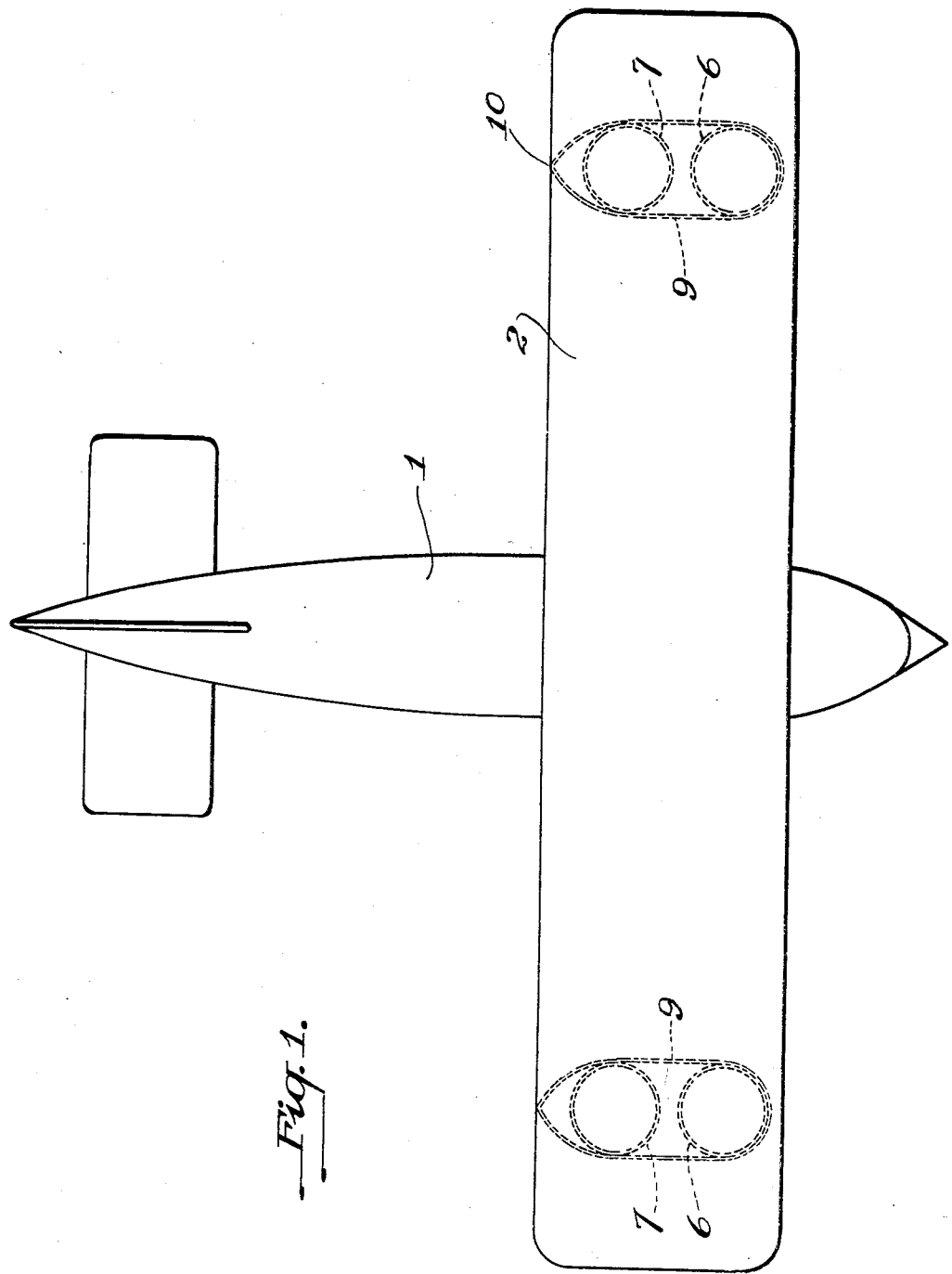

April 24, 1928.
J. M. COBURN ET AL
1,667,287
SOUND PROJECTING HORN ON WING STRUCTURE OF AIRCRAFT
Filed June 2, 1926 2 Sheets-Sheet 2
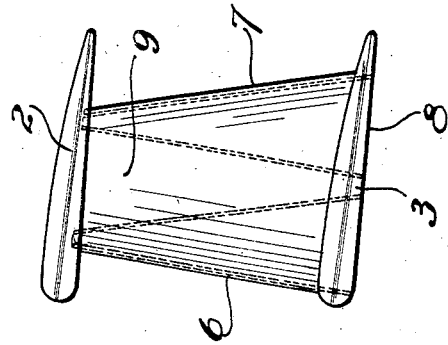
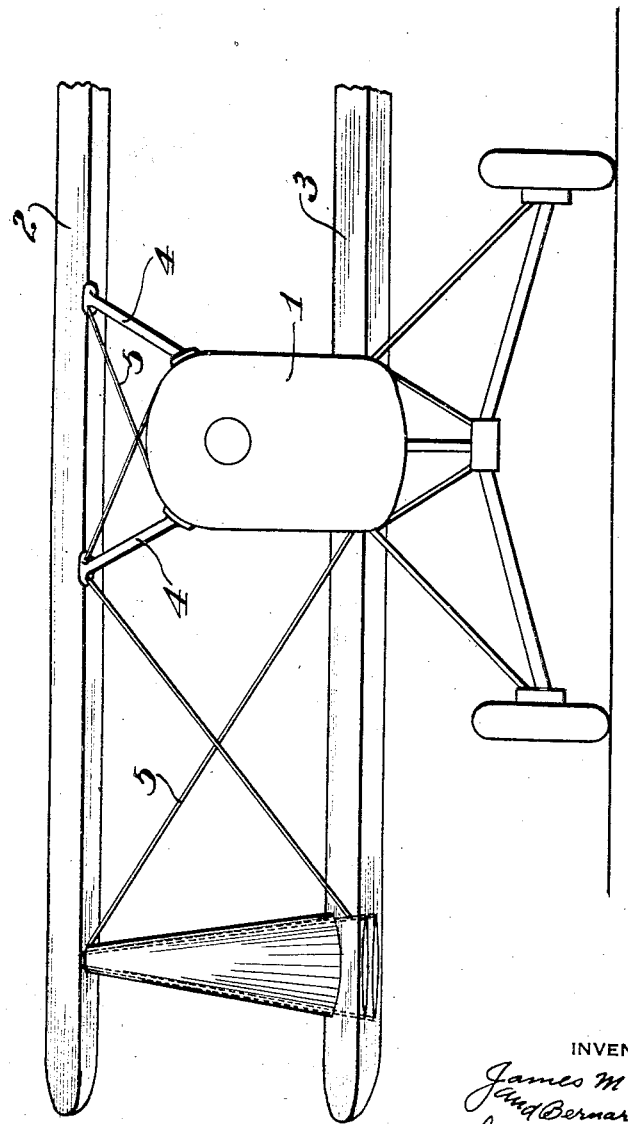

Patented Apr. 24, 1928.

1,667,287

UNITED STATES PATENT OFFICE.

JAMES M. COBURN AND BERNARD KNAPP, OF KANSAS CITY, MISSOURI, ASSIGNORS TO PLANE SPEAKER CORPORATION, OF KANSAS CITY, MISSOURI, A CORPORATION OF DELAWARE.

SOUND-PROJECTING HORN ON WING STRUCTURE OF AIRCRAFT.

Application filed June 2, 1926. Serial No. 113,182.

This invention relates to apparatus for projecting audible sounds from aircraft over a relative wide surface area and more particularly to the mounting of sound projecting horns on aircraft structures for this purpose.

In a copending application Serial No. 29,839, filed May 12, 1925, entitled Aeroplane amplifier is disclosed an amplifying system for transmitting sound from aircraft structures at relatively high altitudes to be audible to an audience located underneath the aircraft. In this application is disclosed the mounting of a sound projecting horn in the fuselage of an aeroplane with the opening or enlarged end of the horn extending through the under side of the fuselage.

The present invention distinguishes from the subject matter of the before mentioned application in that it provides for mounting a plurality of amplifying or sound projecting horns in the wing structure of the aircraft, the horns being arranged to constitute struts which they are designed to replace between an upper and lower wing member on both sides of the fuselage with their enlarged portions or openings projecting downwardly similarly to the disposition of the horn member in the fuselage structure previously referred to.

It is among the objects of this invention to provide sound projecting horns for aircraft structures which shall constitute an integral part of the wing structures and which shall be disposed in such relation and secured to the wings in a manner to constitute supporting struts.

Another object of this invention is to provide sound projecting horns for aircraft which shall be built into the frame structure in a manner to eliminate as far as possible any interference with the manipulation and flying efficiency thereof, and without materially enhancing the gross weight of the structure.

Another object of the invention is to mount the sound projecting horns in pairs in alignment to adapt them to be enclosed in a fairing to produce a stream-line structure.

The manner of utilizing the sound projecting horns in connection with amplifying systems is the same as that described in the above mentioned application and constitutes no part of the present invention.

In the accompanying drawings constituting a part hereof, and in which like reference characters designate like parts, Fig. 1 is a top plan view of an aeroplane illustrating the mounting of the sound projecting horns in accordance with the principles of this invention; Fig. 2 is a front elevational view thereof with the right hand wing structure partially broken off; and Fig. 3 is a side elevational view of one of the wings illustrating the mounting of the horns between the upper and lower wing members.

Referring to the several figures of the drawings, the structure therein illustrated comprises the usual fuselage 1 having associated therewith and secured thereto an upper and lower wing 2 and 3, respectively. The wings are secured to the fuselage in the customary manner as by brackets 4 and reinforcing braces 5. In place of the usual struts connecting the upper and lower wings a plurality of sound projecting horns 6 and 7 are disposed between the wing members with their mouth or large opening 8 projecting through the bottom wing cover.

The sound projecting horns 6 and 7 are arranged in pairs as shown in Figs. 1 and 3, one behind the other, in a plane parallel to the longitudinal axis of the fuselage, the pairs of horns being enclosed in a fairing 9 which terminates at a point 10 at the rear of the wing to stream-line the horn members, in accordance with the well known practice followed in the construction of aircraft. The lower portions of the horns are supported on the frame structure of the lower wing 3 and the upper portions are respectively secured to the frame structure of the upper wing 2 in any suitable manner. The horns are provided with the usual sound reproducing devices (not shown) which are connected by suitable leads disposed in the upper wing structure to the amplifying system contained in the fuselage or in any other suitable part of the aircraft.

As shown in Fig. 3 the lower portions of the horn may be cut away in such a manner as to produce the proper angular relation of the upper and lower wings and to provide supporting columns or struts between the wing members in which the stresses are uniformly distributed over the entire horn structure.

By this manner of mounting the sound projecting horns they are placed where they will not interfere with the proper operation of the aircraft and where they will not take up room which may be desirable to use for other parts of the amplifying system.

Another advantage of mounting the horns in this manner is that thereby the sound is projected vertically downward from the aircraft, which is highly desirable, it being a relatively simple matter for the operator to control the flight of the plane so that the plane of the wings is maintained parallel with the ground surface over which the aircraft is passing, thus assuring the downward disposition of the horns at all times.

It is evident from the foregoing description of this invention that sound projecting horns constructed in the wing portion of aeroplanes to constitute the same an integral structural element provides a simple and relatively inexpensive means for utilizing the aircraft for projecting audible sounds in the direction of the earth for commercial advertising purposes and the like.

Although a specific embodiment of this invention has been herein set forth it will be obvious to those skilled in the art that various modifications may be made in the arrangement and dispositions of the horn members relative to the wing structure without departing from the principles herein set forth, for example a single horn may be utilized in place of the pairs of horns and constructed in such forms as to provide adequate support between the wings in place of a strut or a strut may be utilized in addition to the horn where but a single horn is employed on each end of the wing. It also follows that a reinforcing strut may be employed where two or more horns are utilized as herein illustrated.

We claim:

1. In an aeroplane structure, the combination with the wing structure of sound projecting horns mounted in a manner to constitute an integral supporting structural member thereof.

2. In an aeroplane structure the combination with the wings of a plurality of sound projecting horns, said horns being formed integrally with the wing structure.

3. In an aeroplane structure the combination with the wings of a plurality of sound projecting horns, said horns being disposed between the upper and lower wings and secured at their respective ends thereto.

4. In an aeroplane structure the combination with the wings of a plurality of sound projecting horns, said horns being disposed between the upper and lower wings and formed integrally therewith.

5. In an aeroplane structure the combination with the wings of a plurality of sound projecting horns, said horns being secured between the upper and lower wings to constitute supporting struts.

6. In an aeroplane structure the combination with a pair of wings, of a plurality of sound projecting horns disposed between and secured to the upper and lower wings on both sides of the fuselage, said horns being joined to the wing structure in a manner to constitute supporting struts.

7. In an aeroplane structure the combination with a pair of wings, of a plurality of sound projecting horns disposed between and secured to the upper and lower wings on both sides of the fuselage, said horns being mounted in pairs to constitute supporting struts between the wing structures.

8. In an aeroplane structure the combination with a pair of wings, of a plurality of sound projecting horns disposed between and secured to the upper and lower wings on both sides of the fuselage, said horns being mounted in pairs, and surround with fairing to produce a stream-line structure.

In testimony whereof, we hereunto sign our names.

JAMES M. COBURN.
BERNARD KNAPP.